Figure 1:
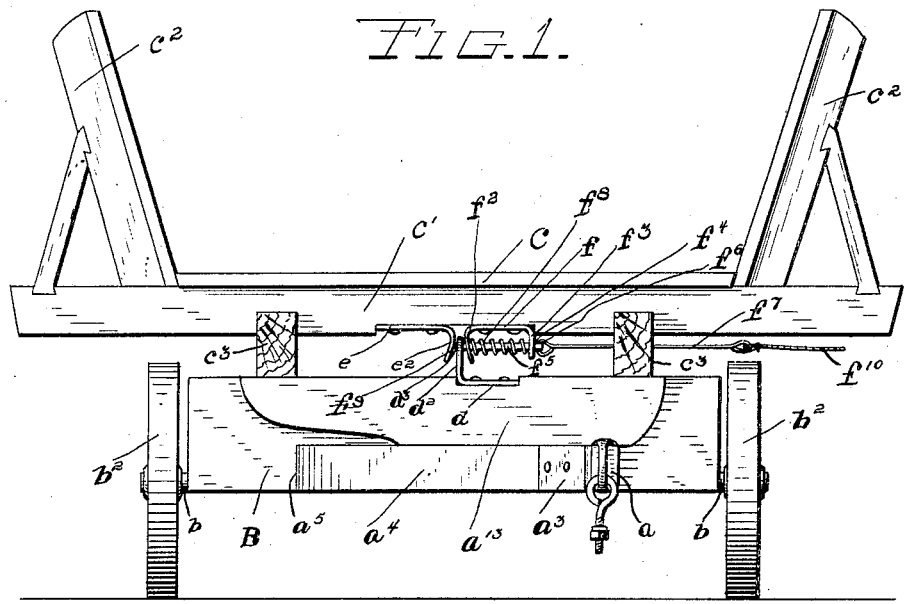

No. 789,784. PATENTED MAY 16, 1905.
C. P. BALCH.
VEHICLE.
APPLICATION FILED JULY 20, 1904.

2 SHEETS—SHEET 1.

Witnesses
J. R. Thomas
E. T. Brandenburg

Inventor
C. P. Balch
by R. G. Dyrenforth
his Attorney

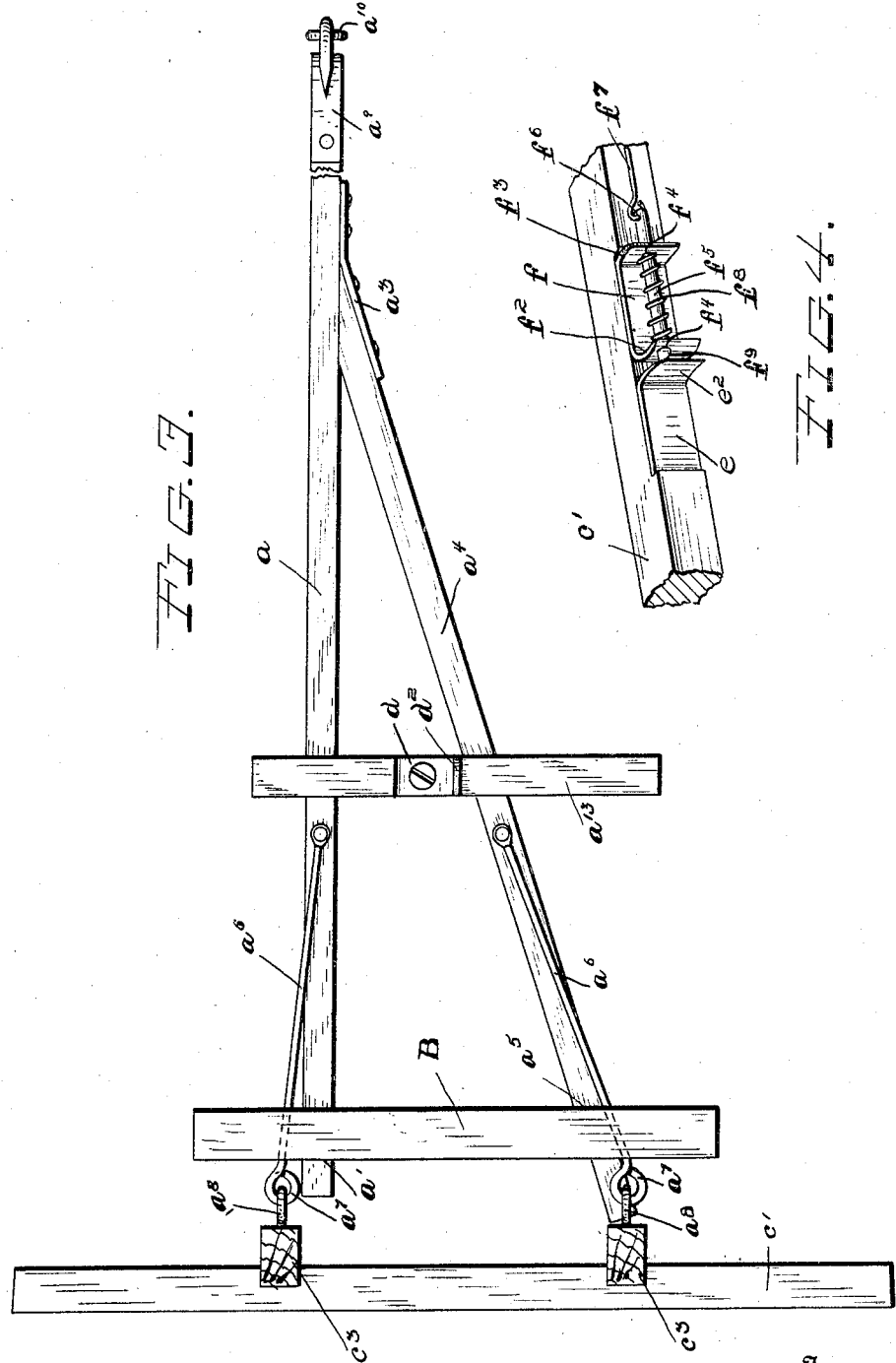

No. 789,784. Patented May 16, 1905.

UNITED STATES PATENT OFFICE.

CHARLES P. BALCH, OF DUFUR, OREGON.

VEHICLE.

SPECIFICATION forming part of Letters Patent No. 789,784, dated May 16, 1905.

Application filed July 20, 1904. Serial No. 217,428.

*To all whom it may concern:*

Be it known that I, CHARLES P. BALCH, a citizen of the United States, residing at Dufur, in the county of Wasco and State of Oregon, have invented certain new and useful Improvements in Vehicles; and I do hereby declare the following to be a full, clear, and exact description of the invention, such as will enable others skilled in the art to which it appertains to make and use the same.

Straw-carts now in use for hauling and dumping the straw from combined harvesters are all center draft, the wheels of the straw-carts following or tracking with the master-wheels supporting the harvesters. The sacked grain from the harvesters is dumped in piles of five or six at a dump and slide to the ground, and the least variation in the line of travel of the harvester, either on angles or in turns or otherwise, causes the wheels of the straw-cart to pass over the sack piles, thereby tearing some or all of the sacks in the piles passed over, causing the loss of a large amount of grain in every field.

A further objection to the straw-carts now in use is the limited carrying capacity, which leaves the straw scattered over the field in small piles and allows all the foul matter to be blown over the same and scattered through the field from the harvester, thereby sowing in the field the seeds of weeds and vegetation which are detrimental to the successful raising of large crops.

The tripping devices for dumping the straw-carts now in use are also in many instances not practical or convenient.

The objects of my invention, therefore, are to provide a construction of straw dump-cart which shall remedy these defects or objections and which shall be of very light and simple, but exceedingly durable and serviceable construction, and I attain these desirable results by constructing my straw dump-cart with a side-draft tongue, which keeps the wheels of the dump-cart at a safe distance from the sack-dumps and never allows the wheels to pass over sacks, no matter how sharp a turn or angle may be made by the travel of the harvester, as the side draft places the tread of the dump-cart wheels a considerable distance inside of the tread of the master-wheels of the harvester and gives the dump-cart plenty of leeway to make any kind of a turn and miss the sack piles. The largest carrying capacity of a dump-cart built in accordance with my invention allows the cart to dump the straw in piles containing a ton or more, and thereby all the foul matter coming from the harvesting machinery is kept in the straw and dumped with it, which prevents its being scattered.

My invention consists generally in the novel construction, arrangement, and combination of parts herein described and claimed.

In the accompanying drawings, forming part of this specification, I have illustrated one embodiment of my invention, although it is susceptible of many embodiments.

Figure 2:
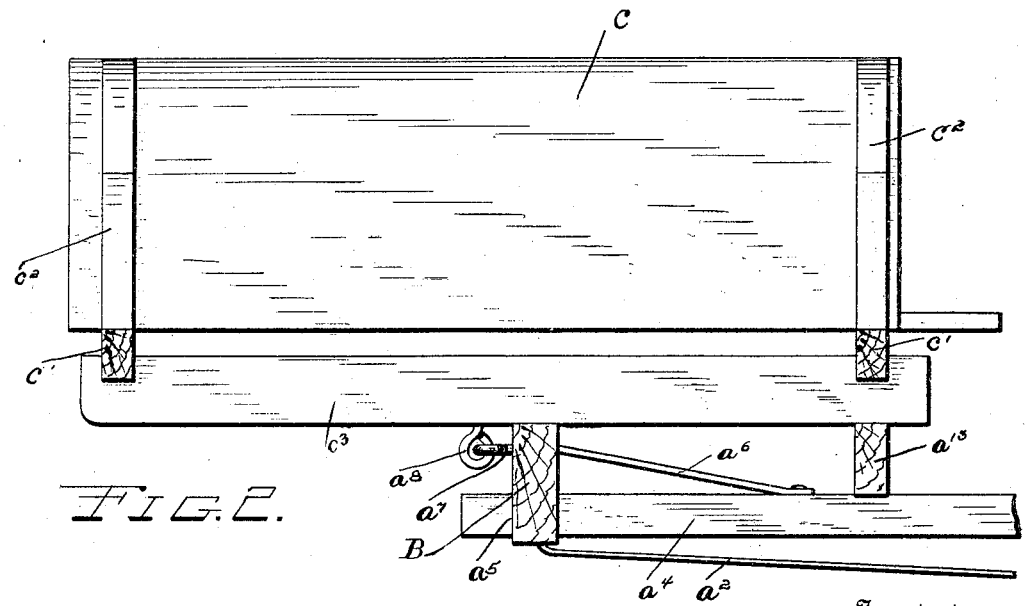

In the drawings, Figure 1 is a view in front elevation of my device in normal loading or untripped position. Fig. 2 is a view in side elevation thereof. Fig. 3 is a top plan view of the peculiar running-gear forming part of my invention, and Fig. 4 is a detail view of the locking device.

Referring to the drawings, $a$ is my side-draft tongue, suitably secured to the axle B toward one end thereof, as by being seated in a mortise $a'$ in the axle and bolted or nailed therein and preferably braced underneath by a buffer-rod $a^2$. By locating the tongue away from the center of the vehicle I obtain a side draft which, placing the tread of the dump-cart wheels a considerable distance inside of the tread of the master-wheels of the harvester, keeps the dump-cart wheels at a safe distance from the sack-dumps and never allows the wheels to pass over sacks no matter how sharp a turn is made by the travel of the harvester to which the dump-cart is attached. An angle-iron $a^3$ connects the tongue to one end of a brace $a^4$, extending at an angle to the tongue, the other end of the brace being suitably secured, as in a mortise $a^5$, in the axle and bolted or nailed therein.

Brace-rods $a^6 a^6$ are preferably secured to the tongue $a$ and to the brace $a^4$ and desirably pass through (or they may be secured to) the axle B and have their ends bent to form coupling-links $a^7 a^7$, engaging ring-bolts $a^8 a^8$, screwed in longitudinal timbers $c^3 c^3$ or in the under side of the vehicle-bed, as may be preferred.

On the forward end of the tongue $a$ is provided means for attachment to another vehicle, such as the harvester, and comprises, preferably, a staple-tip $a^9$, engaging the eye of a ring-bolt $a^{10}$, having its outer end screw-threaded and carrying a washer and a nut, this providing an adjustable attachment to a vehicle, through the rear axle of which the bolt may be passed.

The axle B carries stub-shafts $b\ b$, on which are mounted wheels $b^2\ b^2$, which wheels for each vehicle may be two in number or more, in which latter event the tongue $a$ and brace $a^4$ extend to the rear axle and the coupling-links connected at the rear thereof, as would be obvious.

A bolster $a^{13}$ may be securely fastened to the tongue $a$ and to the brace $a^4$ in any suitable manner.

Extending transversely beneath the wagon-bed C toward each end thereof and secured thereto are timbers $c'\ c'$, carrying outward-flaring wagon-standards $c^2$, and extending longitudinally beneath the wagon-bed are timbers $c^3\ c^3$, carrying the ring-bolts $a^8\ a^8$, and which timbers are preferably mortised at their ends and securely fastened to the transverse timbers $c'\ c'$.

Rigidly secured on the upper surface of the bolster $a^{13}$ is a plate $d$, with an upward-bent end $d^2$, having an opening $d^3$ therein.

Rigidly secured to the front transverse timber $c'$ or to the under side of the vehicle-bed, as may be preferred, is a plate $e$, with a downturned end $e^2$. A plate $f$ is also rigidly secured to the transverse timber or to the under side of the vehicle-bed, as may be preferred, and has two downturned ends $f^2\ f^3$, with openings $f^4$ therein, through which passes a pin $f^5$, having at one end an eye $f^6$, engaging the hooked end of a wire $f^7$. A spiral spring $f^8$ is wound around the pin $f^5$, keeping the pin normally sprung with its end through the openings $d^3$ and the opening in the end $f^2$, this maintaining the body of the dump-cart in normal position for loading. The under side of the pin $f^5$ is beveled at its end, as at $f^9$, so that when the wagon-body is brought down the weight thereof exerted at the beveled portion against the upward-bent arm of the plate $d$ will cause the bolt or pin $f^5$ to be automatically retracted, and when the body is in proper position the pressure of the spring $f^8$ will push the pin $f^5$ through the opening $d^3$ and the opening in the end $f^2$, locking the body against tilting. This is accomplished by simply bringing the wagon-body down smartly, as by the weight of a man standing on the forward end of the wagon-bed, after the load has been dumped, when the pin will snap into locking position. The manner of dumping the load on the wagon is obvious. A man, either on the forward end of the wagon or at a distance from the wagon, pulls on a rope $f^{10}$, connected to the wire $f^7$, which, being connected with the pin $f^5$ retracts the same, unlocking the fastening means and permitting tilting of the wagon-bed, which will thereupon immediately tilt by reason of the weight of the load therein.

The objects of lightness and rigidity of construction are aimed at in this invention. Hence the system of mortising and bracing without the use of heavy irons for the purpose.

In the operation of the device it will be found particularly advantageous when attached to and used in connection with a harvesting and threshing machine, as the side draft renders impossible injury by the dump-cart wheels to bags of grain dumped near one side by the thresher. Owing to its lightness of construction, it requires but little power to operate it, and its outward-flaring body is adapted to carry a large load of the bulky refuse matter from the thresher, which matter can be expeditiously dumped when desired without scattering the same by simply pulling the rope connected with the wire rod attached to the fastening-pin.

Many modifications both in the construction and use of my device may obviously be made without departing from the spirit of the invention, and all such minor modifications I distinctly claim to be within the scope and purview of my invention, wherefore I do not desire to be restricted to the exact forms of use and to the details of construction herein described and illustrated.

Having thus fully described my invention, what I claim as new, and desire to secure by Letters Patent, is—

1. In a vehicle, an axle, a tongue connected thereto, a brace connected to the tongue, a wagon-body, and a pivotal connection between the tongue and brace and the vehicle-body to permit tilting of the latter.

2. In a vehicle, an axle, a tongue connected thereto, a brace connected to the tongue, a wagon-body, a pivotal connection between the tongue and the vehicle-body, and a pivotal connection between the brace and the vehicle-body.

3. In a vehicle, an axle, a tongue connected thereto, a brace connected to the tongue, extending at an angle thereto, and also secured to the axle, a wagon-body, and a pivotal connection between the tongue and brace and the wagon-body to permit tilting of the latter.

4. In a vehicle, an axle, a side-draft tongue connected thereto, a brace connected to the tongue, extending at an angle thereto, and also secured to the axle, a connection between the tongue and the vehicle-body, a like connection between the brace and the vehicle-body, a tilting wagon-body, and means constructed to permit tilting thereof.

5. In a vehicle, an axle, a side-draft tongue connected thereto, a brace connected to the tongue, extending at an angle thereto, and also secured to the axle, a connection between the tongue and the vehicle-body, a like connection between the brace and the vehicle-body, a tilting wagon-body, and means constructed to permit tilting thereof, said tilting means also constructed to lock the body in normal loading position after such tilting.

6. In a vehicle, an axle, a side-draft tongue connected thereto, a brace connected to the tongue, extending at an angle thereto, and also secured to the axle, a connection between the tongue and the vehicle-body, a like connection between the brace and the vehicle-body, a tilting wagon-body, and means constructed to permit tilting thereof, said tilting means also constructed automatically to lock the body in normal loading position after such tilting.

7. In a vehicle, an axle, a side-draft tongue secured thereto, a brace connected to the tongue and also to the axle, a connection between the tongue and the wagon-body, a like connection between the brace and the wagon-body, a tilting wagon-body, and coöperating fastening means carried by the vehicle-bed and the brace.

In testimony whereof I affix my signature in the presence of two subscribing witnesses.

CHARLES P. BALCH.

Witnesses:
FRANK MENEFEE,
D. S. DUFUR.